May 8, 1928.
E. G. McCAULEY
PROPELLER HUB SPINNER
Filed July 23, 1925
1,668,972
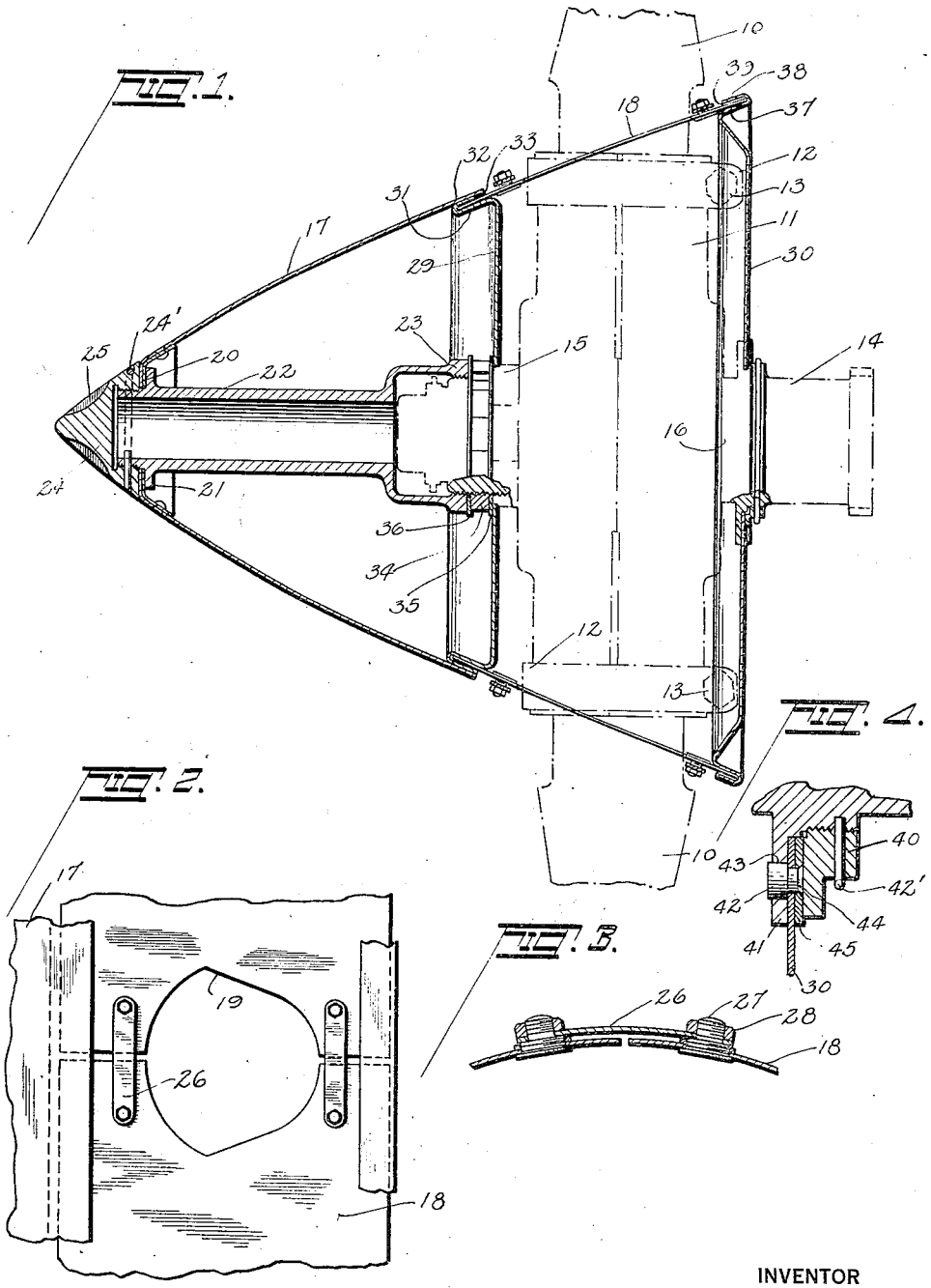
INVENTOR
ERNEST G. McCAULEY
BY *Robert H. Young*
ATTORNEY Patented May 8, 1928.

1,668,972

UNITED STATES PATENT OFFICE.

ERNEST G. McCAULEY, OF DAYTON, OHIO.

PROPELLER-HUB SPINNER.

Application filed July 23, 1925. Serial No. 45,546.

This invention relates to a propeller hub spinner for aircraft propellers of all types, but more particularly propellers of the semi-adjustable type.

The principal object of the invention is to provide a spinner for effectively streamlining the hub portion of the propeller, which enables quick and easy access to all parts of the hub for purposes of adjusting the pitch of the propeller in the case of an adjustable or semi-adjustable pitch propeller, or otherwise for enabling inspection or repair of the propeller hub, or when removing a propeller from the ship.

Another object of the invention is to provide a spinner structure of minimum weight and maximum simplicity providing for the object above referred to and wherein provision is made for a quick detachable cranking connection for cranking the engine by spinning the propeller.

These and other objects of the invention will be made to appear in the course of the following description in which reference is made to the accompanying drawing, wherein Fig. 1 is a central longitudinal section of a spinner structure applied to a propeller hub in accordance with my invention.

Fig. 2 is a somewhat enlarged fragmentary elevational detail of the hub fairing constituting a part of the spinner structure.

Fig. 3 is an enlarged fragmentary sectional detail of the means utilized for securing the fairing sections together, and Fig. 4 is an enlarged fragmentary sectional detail of a means utilized to prevent relative rotation between a part of the spinner structure and the propeller hub.

Spinners heretofore used have all invariably utilized complicated means for fairing the propeller hub and where access to the hub was necessary as in the case of changing the pitch of an adjustable or semi-adjustable pitch propeller or for other purposes such as inspection or repair, or when the propeller was to be removed from the ship, a very tedious operation was involved as the fairing was secured by a great number of small bolts and screws. The operation of removing the fairing in such cases might well consume a half day or more, whereas with my improved spinner structure it is possible to secure complete access to the hub for the purposes mentioned in the space of a few minutes and with the performance of a few comparatively easy wrench operations.

Generally speaking, my invention provides a split fairing, the halves of which are detachably held together at their front and rear edges about the propeller hub between a pair of discs mounted rigidly in front and behind the propeller, the mounting for the rear disc permitting the backing away of the disc from the fairing to enable its removal. I have also provided a rigid support for the air piercing cone of the spinner which is made rigid with the propeller hub and has provided at its outer end a means for making a detachable driving connection with the propeller to spin the same in cranking the engine.

Referring now to the drawing, the blades 10 of a semi-adjustable propeller are adjustably fixed in the hub 11. The latter is usually formed in two sections having clamping bands 12 at the outer ends thereof to secure the hub sections together with the blades in proper pitch adjustment in the hub. The bands 12 are split and have bolts 13 to secure the desired clamping effect. In adjusting the pitch of the propeller, it is necessary to secure access to the bolts 13 in order to loosen the same after which the blades may be turned to the desired pitch when the bolts are again tightened to secure the same in the adjusted position. The specific details whereby the adjustment of pitch is secured are of no special consequence in this case and need not therefore be further described. It will suffice to state that the hub sections are fixed against turning with respect to an engine shaft sleeve 14. The two halves are held by a cone nut 15 threading on the sleeve 14 and jamming the two sections together in centered relation on the sleeve 14 against a conical shoulder provided at 16 on the sleeve 14.

The spinner comprises an air piercing cone 17 in front of the hub 11, and a hub fairing 18 forming a continuation of the cone 17 about the hub 11 and the blades 10, which protrude through openings 19 in the fairing 18. The cone 17 is formed of sheet metal and has an inturned flange 20 setting against a shoulder 21 at the forward end of a central tubular support 22, which extends forwardly from the hub 11, and is rigidly fixed in relation to the hub by a threaded connection at 23 on the forward end of the sleeve 14. The forward end of the cone 17 is detachably secured to the support 22 by a cone nut 24 threading on the outer end of the support 22 in front of the shoulder 21. The nut 24 is machined as indicated at 25 to provide lugs to make detachable driving connections with a coupling such as is commonly employed to engage the hub of an airplane propeller for spinning the same in starting the engine. The nut 24 is suitably locked by a wire ring or clip 24' as shown. It will be apparent that the drive in cranking is directly through the support 22 to the propeller hub.

The fairing 18 consists of two sheet metal parts notched at their adjoining edges so that when placed together they provide openings of the configuration shown at 19 to fit about the end of the propeller hub and about the shank of the propeller blades. The fairing sections are secured together by links 26 fitting over studs 27 mounted in the sections near their adjoining edges in the manner shown in Fig. 3. The studs 27 receive nuts 28 for securing the sections permanently together. A pair of discs 29 and 30 respectively form the supports for the front and rear edges of the fairing 18. The front disc 29 which, like the rear disc 30 is of sheet metal, has its peripheral edge bent forwardly to provide a flange 31, the edge of which is bent back upon itself as shown at 32, leaving an annular recess 33 to receive the forward edge of the fairing 18. The cone 17 has a sliding wedging fit over the disc 29 as shown. The fairing 18 when seated in the recess 33 forms a continuation of the cone 17 and is approximately flush therewith. The disc 29 is maintained in rigid relation with the hub 11 by a nut 34 and washer 35. The nut 34 threads upon the sleeve 14 jamming the washer 35 with the disc 29 against the cone nut 15 previously referred to. Another washer 36 is interposed between the nut 34 and the threaded end 23 of the support tube 22.

The disc 30 is dished to fit over the rear side of the hub 11 and the clamping bands 12 as shown, and has its peripheral edge bent rearwardly to provide a flange 37, the edge of which is bent upon itself as indicated at 38 leaving a second annular recess 39 concentric with the annular recess 33 wherein the rearward edge of the fairing 18 is fitted. The disc 30 approaches the fairing 18 from behind the hub and is held in position by a nut 40 which threads upon the sleeve 14 and jams the disc 30 against a shoulder 41 provided on the sleeve 14. A wire ring or clip 42' may be provided to prevent accidental loosening of the nut 40. The disc 30 is prevented from rotating relative to the hub by the engagement of studs 42 in openings 43 provided in the flange 41. The studs 42 are riveted to the disc 30 as shown at 44. An auxiliary sheet metal ring 45 is provided where the studs are riveted to the disc to afford the necessary thickness and rigidity.

The disc 29 may be held from rotating in a similar manner. It is found that where no provision is made to prevent relative rotation between the discs and the hub, the angular accelerations of the propeller cause the discs to assume a position with the fairing 18 where these parts are driven by contact with the propeller blades or with the hub of the propeller, and in extreme cases the fairing either mars the blades or hub, or the edges of the openings 19 in the fairing become peened, leaving a raised edge. A further complication resulting from a relative rotation of the parts with respect to the hub is that it renders it less easy to remove the fairing when it is desired to have access to the hub as the parts become jammed and wedged in position and are not easily withdrawn. I have found that by providing the fairing 18 of relatively light sheet metal, there is sufficient flexibility so that the fairing is easily spread to enter the forward edge into the recess 33 or to remove the fairing therefrom. I also provide sufficient clearance between the edges of the fairing sections to enable a slight cramping when the rearward edge is made to enter the recess 39.

From the foregoing description it will be apparent that I have provided a very simple, light and economical spinner construction wherein the parts are rigidly supported in proper position streamlining the propeller hub, while at the same time access can be easily had to the propeller hub for removing the propeller or adjusting and fixing the pitch of the propeller as desired. My arrangement further provides for a simple detachable cranking connection.

I claim:

1. The combination with a propeller of a spinner comprising an air piercing cone in front of the propeller, a circular fairing forming a continuation of said cone about the hub of the propeller, and means for quickly detachably holding said fairing in assembled relation to said hub comprising a part movable on and off one edge of said fairing and arranged to be locked in holding position relative thereto.

2. The combination with a propeller of a spinner comprising an air piercing cone in front of the propeller, a circular fairing forming a continuation of said cone about the hub of the propeller, and means for quickly detachably holding said fairing at its front and rear edges comprising two parts movable on and off the opposite edges of said fairing.

3. The combination with a propeller of a spinner comprising an air piercing cone in front of the propeller, a circular fairing forming a continuation of said cone about the hub of the propeller, and means for quickly detachably holding said fairing at its front and rear edges comprising two parts movable on and off the opposite edges of said fairing, the one being fixed on one side of the propeller and the other being movable on the other side of the propeller.

4. The combination with a propeller of a spinner comprising a hollow air piercing cone in front of the propeller, a central support extending forward from the hub of said propeller, and supporting said cone at its apex, a fairing constituting an extension of said cone about the hub of the propeller, and means for supporting said fairing comprising discs in front of and behind said hub, the forward disc serving as a support for the rearward end of said cone.

5. The combination with a propeller of a spinner comprising a hollow air piercing cone in front of the propeller, a central support for said cone extending forwardly from the hub of the propeller and supporting said cone at its apex, a circular fairing forming a continuation of said cone about the hub of the propeller, and means for quickly detachably holding said fairing at its front and rear edges comprising a pair of discs in front of and behind said propeller, the forward disc being fixed and serving to support the rear end of said cone and the front edge of said fairing, the rear disc supporting the rear edge of said fairing and being movable behind the propeller to permit detachability of said fairing.

6. The combination with a propeller of a central support extending forwardly from the hub of the propeller, a disc rigidly mounted in front of the propeller hub at the rear end of said support, a cone member fitting at its rear edge on said disc, and means for holding said cone member on said support at its forward end.

7. The combination with a propeller of a central support extending forwardly from the hub of the propeller, a disc rigidly mounted in front of the propeller hub at the rear edge of said support, a cone member fitting at its rear edge on said disc, means for holding said cone member on said support at its forward end, a disc movably mounted behind said propeller hub, and a circular fairing forming a continuation of said cone member about the propeller hub and supported between the forward and rearward disc for quick detachability.

8. The combination with a propeller of a central support extending forwardly from the hub of the propeller, a disc rigidly mounted in front of the propeller hub at the rear end of said support, a cone member fitting at its rear edge on said disc, means for holding said cone member on said support at its forward end, a disc movably mounted behind said propeller hub, a circular fairing forming a continuation of said cone member about the propeller hub and supported between the forward and rearward discs for quick detachability, and means for holding one of said discs from turning relative to said hub.

9. The combination with a propeller of a central support extending forwardly from the hub of the propeller, a disc rigidly mounted in front of the propeller hub at the rear end of said support, a cone member having a sliding fit at its rear edge on said disc, means for holding said cone member on said support at its forward end, a disc movably mounted behind said propeller hub, a circular fairing forming a continuation of said cone member about the propeller hub and supported between the forward and rearward discs for quick detachability, and means for holding one of said discs from turning relative to said hub, said means comprising pins rigid with said discs for entering sockets provided on said hub.

10. The combination with a propeller of a central support extending forwardly from the hub of the propeller, a circular sheet metal disc fixed with respect to said hub in front thereof at the rear end of said support, said disc having its periphery bent into the form of an outwardly tapering annular flange and a sheet metal cone member having a wedging fit at its rear edge on the flange of said disc and supported at its apex on said central support.

11. The combination with a propeller of a central support extending forwardly from the hub of the propeller, a circular sheet metal disc fixed with respect to said hub in front thereof at the rear end of said support, said disc having its periphery bent into the form of an outwardly tapering annular flange, the edge of which is turned back upon itself to provide an annular recess, a sheet metal cone member having its rear edge fitting over the flange of said disc and supported at its apex on said central support, a second sheet metal disc removably fixed in relation to said hub behind the same and having the periphery thereof bent inwardly in the form of an outwardly tapering flange, the edge of which is bent back upon itself to provide a second annular recess coaxial with the first annular recess, and a sheet metal fairing fitting about the hub of the propeller forming a continuation of said cone member and having its front and rear edges received in said annular recesses.

12. The combination with a propeller and a hub therefor having means enabling the changing and fixing of the pitch of the propeller, of a spinner comprising a front cone portion arranged to be fixed in relation to said hub, and a quickly detachable fairing constituting a continuation of said cone about the hub of the propeller, said fairing comprising separable portions held together detachably at their adjoining edges and demountably in assembled relation at their front and rear edges.

13. The combination with a propeller of a spinner comprising an air piercing cone in front of the propeller, a circular fairing to removably enclose the hub of said propeller and form a continuation of said cone, a member at the back of said cone having a recess to receive the forward edge of said fairing, a second member having a recess therein to receive the rear edge of said fairing, and means for holding said members to retain said fairing therebetween.

14. The combination with a propeller of a spinner structure comprising a central support extending forward from the propeller and rigid therewith, a pair of discs, one immediately in front of said propeller and the other immediately behind the same, a cone supported at its tip on said central support and at its base on the front disc, and a circular fairing constituting a continuation of said cone about the hub of the propeller and supported by the said discs.

15. The combination of a spinner for the hub of an aircraft propeller comprising a circular plate fastened to the hub in the rear thereof, a circular fairing adapted for fitting over the propeller and for telescopic engagement with the plate, a second plate provided with an aperture for fitting over the hub and in engagement with the fairing, means on the hub for engaging said second plate, a conical nose piece terminating in an apex and adapted for telescopic engagement with the fairing, and a bolt engaging the hub for further holding said nose piece in position.

16. The combination of a spinner for the hub of an aicraft propeller comprising a circular plate fastened to the hub behind the propeller, a frustro-conical section enclosing the hub, means for joining the plate and section, and a conical nose piece adapted to engage said section.

17. The combination of a spinner for the hub of an aircraft propeller, comprising a circular plate fastened to the hub behind the propeller, a frustro-concial section including a second plate for enclosing said hub, a conical nose piece adapted for telescopic engagement with said frustro-conical section and means for detachably engaging said nose piece to the hub.

18. The combination as set forth in the claim 17 with the additional element of means for rigidly associating the second plate of the frustro-conical section with the hub.

19. The combination with a propeller of a spinner comprising an air piercing cone in front of the propeller, a frusto conical fairing forming a continuation of said cone about the hub of the propeller, a circular plate provided with a conical flange mounted behind said hub for supporting said fairing, said cone having a sliding fit at its base end on said fairing and means for holding said cone member rigidly in place.

20. In combination with a propeller having a hub, a stream-lined spinner structure and a sleeve positioned within said hub of means on said sleeve for securing said spinner structure to said sleeve.

21. A propeller having a hub comprising in combination a stream-lined spinner structure, designed to be driven by external means, enclosing said hub, and a concial member, said conical member forming the apex and driving connection of said spinner structure for spinning the propeller in starting the engine.

In testimony whereof I affix my signature.

ERNEST G. McCAULEY.